United States Patent [19]
Jensen

[11] Patent Number: 5,894,974
[45] Date of Patent: Apr. 20, 1999

[54] JACK STORAGE CONTAINER

[76] Inventor: Don C. Jensen, 1145 E Miller Creek Rd., Elmo, Utah 84521

[21] Appl. No.: 09/041,247

[22] Filed: Mar. 12, 1998

Related U.S. Application Data

[63] Continuation-in-part of application No. 08/779,832, Jan. 7, 1997, abandoned.

[51] Int. Cl.[6] .................................................. B60R 9/048
[52] U.S. Cl. ........................... 224/404; 70/63; 70/232; 224/543
[58] Field of Search ................................. 224/543, 542, 224/539, 311, 403, 404, 405; 206/564, 527, 803, 822; 296/37.6; 190/119, 120, 121; 70/63, 70, 74–76, 232

[56] References Cited

U.S. PATENT DOCUMENTS

| 1,154,389 | 9/1915 | Fogalsang | 70/232 X |
| 4,750,774 | 6/1988 | Pickering | 224/402 X |
| 4,803,858 | 2/1989 | Parker | 70/232 |
| 5,310,103 | 5/1994 | Weber et al. | 224/311 |

Primary Examiner—Renee S. Luebke

[57] ABSTRACT

A new jack storage container for storing a jack on a vehicle. The inventive device includes a housing formed from separable front and back portions hingedly coupled together at the bottom of the housing. A pair of spaced apart tabs are extended from the top of the housing. Each of the tabs has first and second separable portions with the first portion of each tab located on the front portion of the housing and the second portion of each tab located on the back portion of the housing. Each of the tabs also has a hole extending through it between its respective first and second portions.

13 Claims, 4 Drawing Sheets

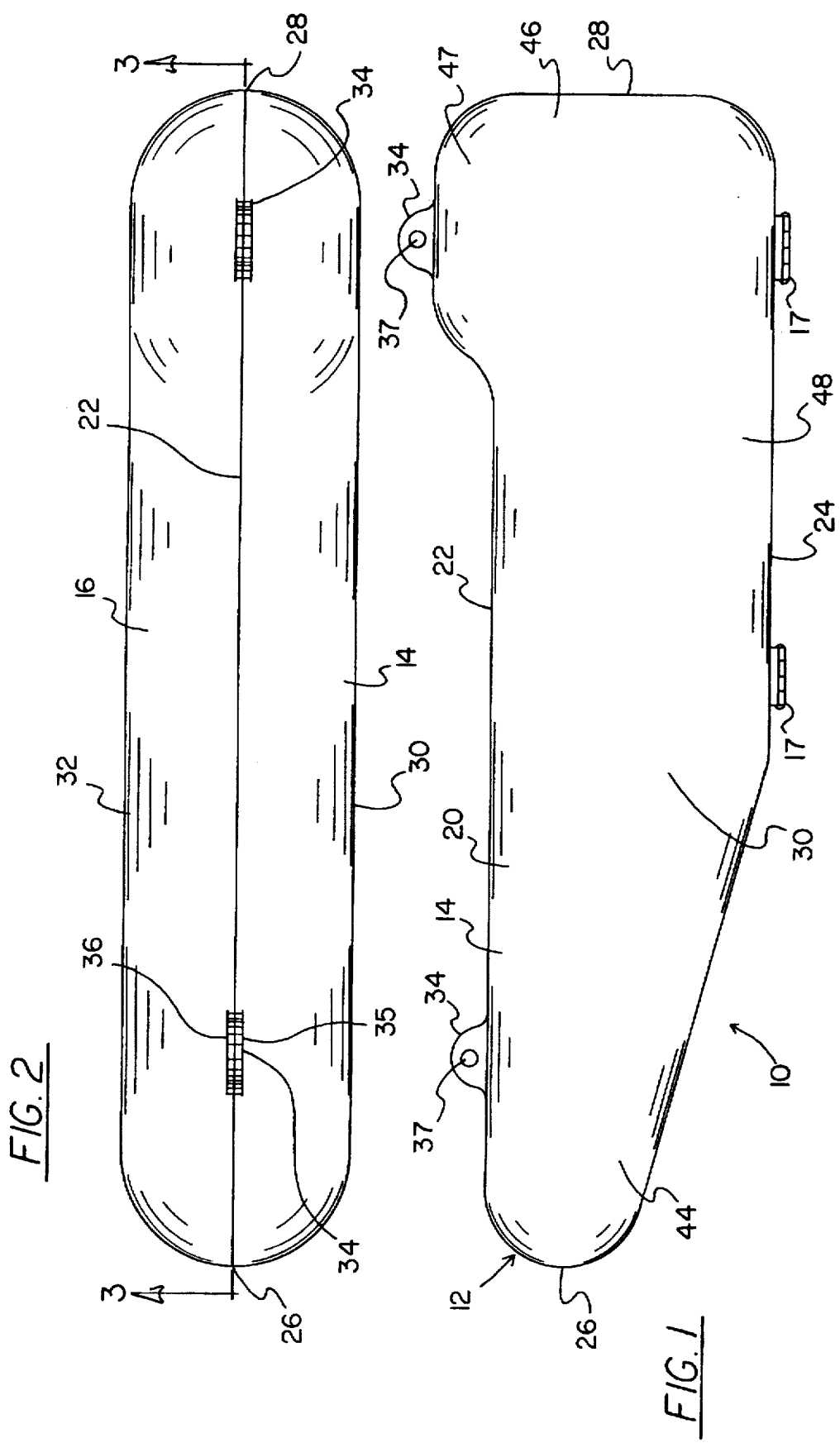

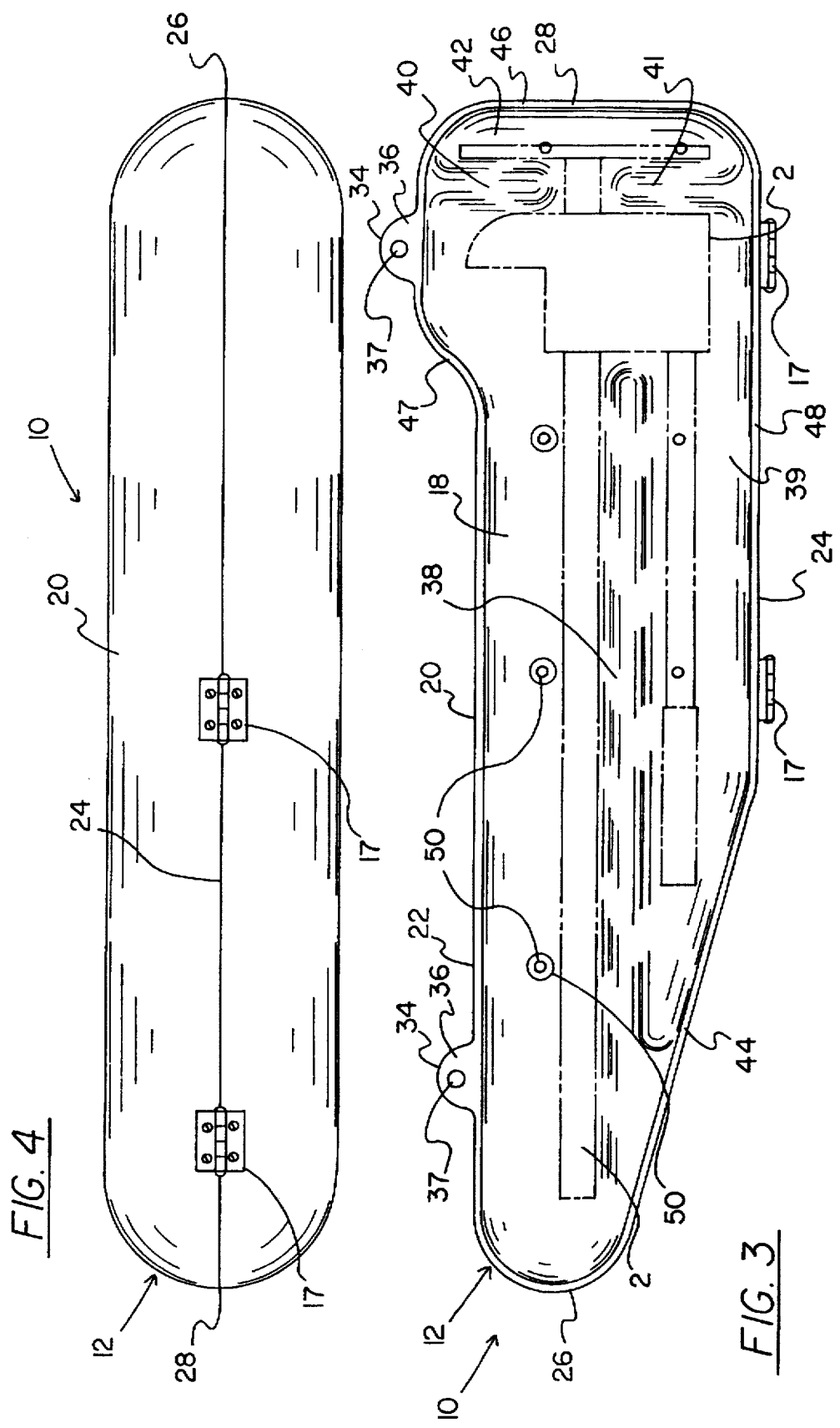

5,894,974

1

JACK STORAGE CONTAINER

CROSS REFERENCE TO RELATED APPLICATION

This application is a continuation-in-part of my prior utility patent application Ser. No. 08/779,832, filed Jan. 7, 1997 and now abandoned.

BACKGROUND OF THE INVENTION

1. Field of the Invention

The present invention relates to storage containers for jacks and more particularly pertains to a new jack storage container for storing a jack on a vehicle.

2. Description of the Prior Art

The use of storage containers for jacks is known in the prior art. More specifically, storage containers for jacks heretofore devised and utilized are known to consist basically of familiar, expected and obvious structural configurations, notwithstanding the myriad of designs encompassed by the crowded prior art which have been developed for the fulfillment of countless objectives and requirements.

Known prior art storage containers for jacks include U.S. Pat. No. 4,249,685; U.S. Pat. No. 4,750,774; U.S. Pat. No. Des. 279,664; U.S. Pat. No. 3,940,009; U.S. Pat. No. 4,007,863; U.S. Pat. No. 4,586,696; U.S. Pat. No. 4,136,904; U.S. Pat. No. 4,674,665; and U.S. Pat. No. 3,831,892.

In these respects, the jack storage container according to the present invention substantially departs from the conventional concepts and designs of the prior art, and in so doing provides an apparatus primarily developed for the purpose of for storing a jack on a vehicle.

SUMMARY OF THE INVENTION

To attain this, the present invention generally comprises a housing formed from separable front and back portions hingedly coupled together at the bottom of the housing. A pair of spaced apart tabs are extended from the top of the housing. Each of the tabs has first and second separable portions with the first portion of each tab located on the front portion of the housing and the second portion of each tab located on the back portion of the housing. Each of the tabs also has a hole extending through it between its respective the first and second portions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is another object of the present invention to provide a new jack storage container which may be easily and efficiently manufactured and marketed.

It is a further object of the present invention to provide a new jack storage container which is of a durable and reliable construction.

An even further object of the present invention is to provide a new jack storage container which is susceptible of a low cost of manufacture with regard to both materials and labor, and which accordingly is then susceptible of low prices of sale to the consuming public, thereby making such jack storage container economically available to the buying public.

Still another object of the present invention is to provide a new jack storage container for storing a jack on a vehicle.

Yet another object of the present invention is to provide a new jack storage container which includes a housing formed from separable front and back portions hingedly coupled together at the bottom of the housing. A pair of spaced apart tabs are extended from the top of the housing. Each of the tabs has first and second separable portions with the first portion of each tab located on the front portion of the housing and the second portion of each tab located on the back portion of the housing. Each of the tabs also has a hole extending through it between its respective the first and second portions.

Still yet another object of the present invention is to provide a new jack storage container that may be mounted to the side wall of a load bed of a vehicle for easy access by a user.

Even still another object of the present invention is to provide a new jack storage container that keeps a jack in place so that it can be easily located and so that it does not side all over the load bed of a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic front side view of a new jack storage container according to the present invention.

FIG. 2 is a schematic top side view of the present invention.

FIG. 3 is a schematic sectional view of the back portion of the present invention taken from line 3—3 of FIG. 2.

FIG. 4 is a schematic bottom side view of the present invention.

DESCRIPTION OF THE PREFERRED EMBODIMENT

Figure 5:
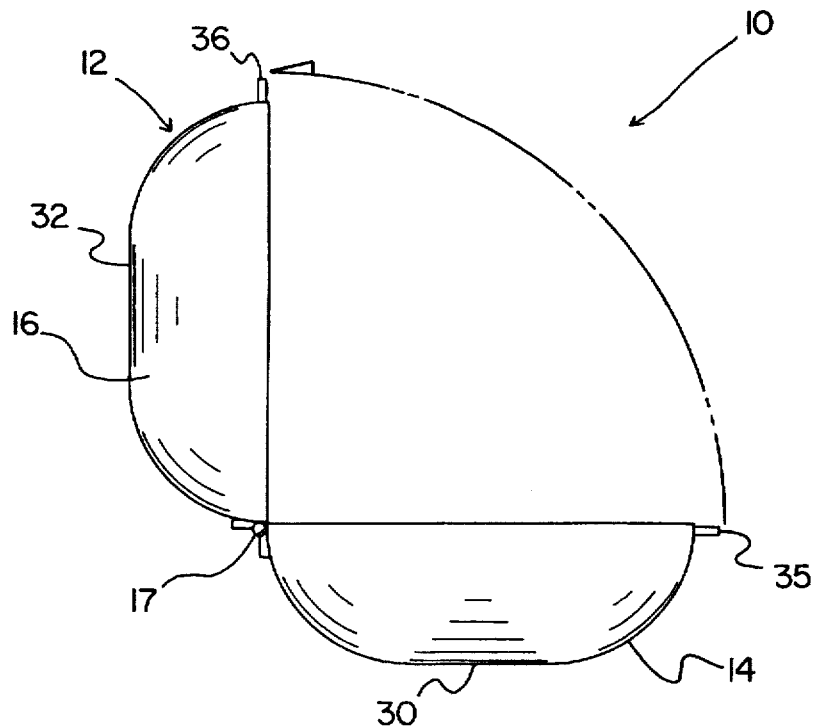
FIG. 5 is a schematic end side view of the present invention.

With reference now to the drawings, and in particular to FIGS. 1 through 8 thereof, a new jack storage container embodying the principles and concepts of the present invention and generally designated by the reference numeral 10 will be described.

As best illustrated in FIGS. 1 through 8, the jack storage container 10 generally comprises a housing 12 formed from separable front and back portions 14,16 hingedly coupled together at the bottom 24 of the housing 12. A pair of spaced apart tabs 34 are extended from the top 22 of the housing 12. Each of the tabs has first and second separable portions with the first portion 35 of each tab located on the front portion 14 of the housing 12 and the second portion 36 of each tab located on the back portion 16 of the housing 12. Each of the tabs 34 also has a hole 37 extending through it between its respective first and second portions 35,36.

In use, the storage container 10 is designed for mounting to the inside of the side wall 1 of a load bed of a vehicle, preferably above the rear wheel well of the vehicle. The storage container 10 is designed for holding a jack 2 and other items 4 inside it. In closer detail, the housing 12 is formed from separable front and back portions 14,16. The housing 12 has inner and outer surfaces 18,20, a top 22, a bottom 24, opposite first and second ends 26,28, and front and back sides 30,32. The inner surface 18 of the housing 12 defines an interior space for holding items. Preferably, the corners of the housing 12 are rounded for preventing injury to a user. Ideally, the housing 12 is made of a rust free material such as plastic so that it is generally weatherproof.

The front and back portions 14,16 of the housing 12 are hingedly coupled together by a pair of hinges 17 at the bottom 24 of the housing 12. A pair of spaced apart tabs 34 are extended from the top 22 of the housing 12. Each tab 34 has first and second separable portions 35,36 with the first portion 35 of each tab located on the front portion 14 of the housing 12 and the second portion 36 of each tab located on the back portion 16 of the housing 12. Each of the tabs 34 has a hole 37 extending through it between its respective the first and second portions 35,36. These holes 37 are designed for inserting the locking bolt of a padlock through it.

As illustrated in FIG. 3, the inner surface 18 of the housing 12 located on the back portion 16 of the housing 12 has an elongate ridge 38 outwardly extending from it between the ends 26,28 of the housing 12. The elongate ridge 38 defines a generally U-shaped compartment 39 which is designed for resting a portion of a jack 2 therein to hold it in place in the interior of the housing 12. In the preferred embodiment of the invention, the inner surface 18 of the housing 12 located on the back portion 16 of the housing 12 also has a pair of opposing and spaced apart finger ridges 40,41 outwardly extending from it so that one of the finger ridges 40 extends from the top 22 of the housing 12 and another finger ridge 41 extends from the bottom 24 of the housing 12. The finger ridges 40,41 are located towards the second end 28 of the housing 12 such that a base compartment 42 is defined between the finger ridges 40,41 and the second end 28 of the housing 12. The base compartment 42 is designed for disposing another portion such (as a base portion) of a jack 2 therein. The space between the fingers defines a throughway between the compartments of the housing 12 so that the jack 2 may extend between the two compartments.

Figure 6:
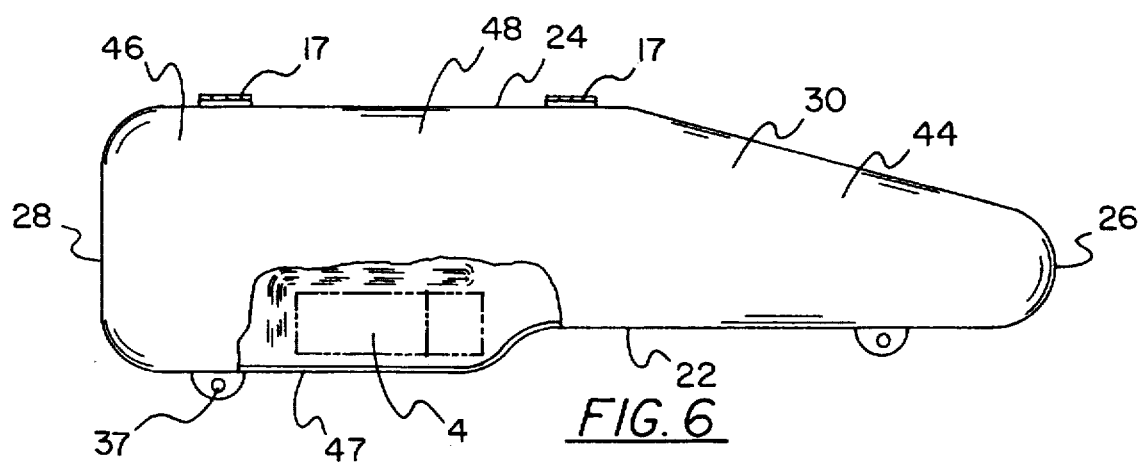
FIG. 6 is a schematic breakaway front view of an optional embodiment of the present invention with a longer second region.
Figure 7:
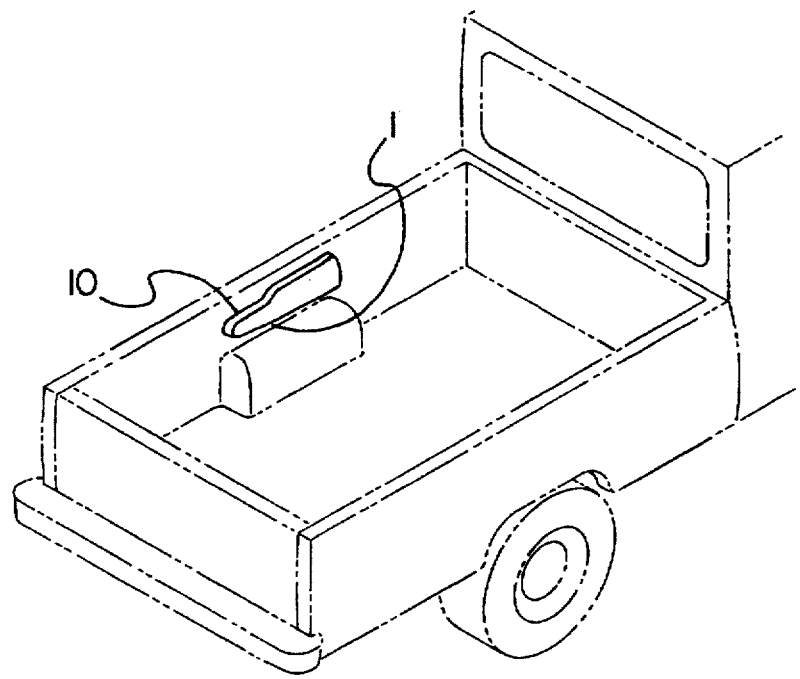
FIG. 7 is a schematic perspective view of the present invention in use on a side wall of a load bed of a vehicle.
Figure 8:
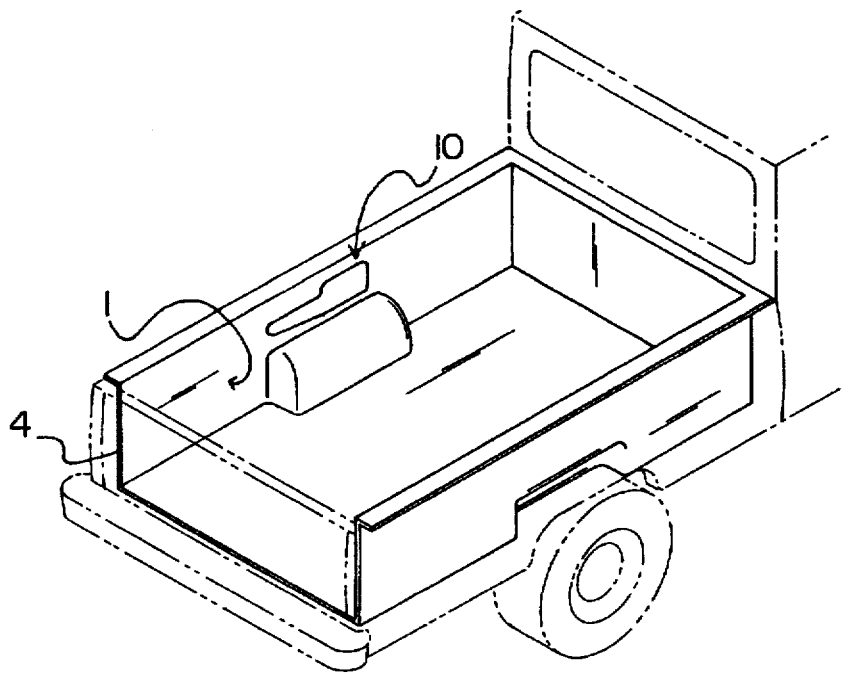
FIG. 8 is a schematic perspective view of an alternative embodiment of the present invention included in a bed liner on a load bed of a vehicle.

Preferably, the housing 12 has first, second and third regions. The first region 44 is located towards the first end 26 of the housing 12 and the second region 46 is located towards the second end 28 of the housing 12. The third region 48 of the housing 12 is interposed between the first and second regions 44,46. In the preferred embodiment, the bottom 24 of the housing 12 located at the first region 44 tapers from the third region 48 of the housing 12 towards the first end 26 of the housing 12. Also in the preferred embodiment, the top 22 of the housing 12 located at the second region 46 has an extended portion 47 extending from it such that the distance between the top 22 and bottom 24 of the housing 12 in the second region 46 of the housing 12 is greater than the distance between the top 22 and bottom 24 of the housing 12 in the third region 48 of the housing 12. Ideally, the top 22 and bottom 24 of the housing 12 in the third region 48 of the housing 12 are generally parallel to one another. In an optional alternate embodiment, as illustrated in FIG. 6, the length of the second region 46 between the ends of the housing 12 is greater than the length of the third region 48 between the ends of the housing 12, so that containers 4 of lubricant or oil may be contained in the second region 46 of the housing 12.

With reference to FIG. 3, the back portion 16 of the housing 12 has a plurality of mounting apertures 50 extending between the inner and outer surface of the housing 12. The mounting apertures 50 are designed for extending fasteners through it to mount the back portion 16 to the side wall 1 of a load bed of a vehicle.

Ideally, the housing 12 has a length (defined between the ends of the housing 12) less than about 58 inches and a height (defined between the top 22 and bottom 24 of the housing 12) less than about 12 inches. In this ideal embodiment, it is preferred that the thickness between the front and back sides 30,32 of the housing 12, is less than about 8 inches.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A storage container for mounting to an inside of a side wall of a load bed of a vehicle, said storage container comprising:

a housing being formed from separable front and back portions and having inner and outer surfaces, a top, a bottom, and opposite first and second ends, said inner surface of said housing defining an interior space;

said front and back portions of said housing being hingedly coupled together at said bottom of said housing; and a pair of spaced apart tabs being extended from said top of said housing, each of said tabs having first and second separable portions, said first portion of each of said tabs being located on said front portion of said housing, said second portion of each of said tabs being located on said back portion of said housing, each of said tabs having a hole extending therethrough between its respective said first and second portions;

wherein said inner surface of said housing located on said back portion of said housing has an elongate ridge being extended therefrom between said ends of said housing, said elongate ridge defining a generally U-shaped compartment;

wherein said inner surface of said housing located on said back portion of said housing has a pair of opposing and spaced apart finger ridges outwardly extending therefrom, one of said finger ridges being extended from said top of said housing, another of said finger ridges being extended from said bottom of said housing, said finger ridges being located towards said second end of said housing; and wherein a base compartment is defined between said finger ridges and said second end of said housing, said finger ridges defining a throughway therebetween between said U-shaped compartment and said base compartment.

2. The storage container of claim 1, wherein said housing has a plurality of corners, wherein said corners are rounded.

3. The storage container of claim 1, wherein said housing comprises plastic.

4. The storage container of claim 1, wherein said housing has first, second and third regions, said first region being located towards said first end of said housing, said second region being located towards said second end of said housing, said third region of said housing being interposed between said first and second regions of said housing, wherein said bottom of said housing located at said first region tapers from said third region of said housing towards said first end of said housing.

5. The storage container of claim 4, wherein said top of said housing located at said second region has an extended portion extending therefrom such that the distance between said top and bottom of said housing in said second region of said housing is greater than the distance between said top and bottom of said housing in said third region of said housing.

6. The storage container of claim 4, wherein said top and bottom of said housing in said third region of said housing are generally parallel to one another.

7. The storage container of claim 1, wherein said back portion of said housing has a plurality of mounting apertures extending between said inner and outer surface of said housing.

8. The storage container of claim 1, wherein said housing has a longitudinal axis extending between said first and second ends of said housing, wherein a zone line is extended across said housing substantially perpendicular to said longitudinal axis of said housing, said zone line being positioned at a midpoint along said longitudinal axis of said housing, said midpoint being positioned essentially equidistant between said first and second ends of said housing, wherein said zone line divides said housing into first and second halves, wherein one of said tabs is located in said first half, and wherein another of said tabs is located in said second half.

9. The storage container of claim 1, wherein said finger ridges are substantially collinear.

10. The storage container of claim 9, wherein said finger ridges are extended substantially perpendicular to said elongate ridge.

11. The storage container of claim 1, further comprising a jack being disposed in said U-shaped compartment and said base compartment, said jack being extended through said throughway between said U-shaped compartment and said base compartment.

12. A storage container for mounting to a side wall of a load bed of a vehicle above a rear wheel well upwardly extending from the load bed of the vehicle, said storage container comprising:

a housing being formed from separable front and back portions and having inner and outer surfaces, a top, a bottom, opposite first and second ends, and a plurality of corners, said inner surface of said housing defining an interior space, wherein said housing comprises plastic, wherein said corners of said housing are rounded;

said front and back portions of said housing being hingedly coupled together at said bottom of said housing;

a pair of spaced apart tabs being extended from said top of said housing, each of said tabs having first and second separable portions, said first portion of each of said tabs being located on said front portion of said housing, said second portion of each of said tabs being located on said back portion of said housing, each of said tabs having a hole extending therethrough between its respective said first and second portions, each of said holes of said tabs being adapted for extending a locking bolt of a padlock therethrough;

said housing having a longitudinal axis extending between said first and second ends of said housing;

a zone line being extended across said housing substantially perpendicular to said longitudinal axis of said housing, said zone line being positioned at a midpoint along said longitudinal axis of said housing, said midpoint being positioned essentially equidistant between said first and second ends of said housing;

said zone line dividing said housing into first and second halves;

one of said tabs being located in said first half, another of said tabs being located in said second half for helping prevent opening of said housing when locks are extended through said holes of said tabs;

said inner surface of said housing located on said back portion of said housing having an elongate ridge being extended therefrom between said ends of said housing, said elongate ridge defining a generally U-shaped compartment for resting a portion of a jack therein;

said inner surface of said housing located on said back portion of said housing having a pair of opposing and spaced apart finger ridges outwardly extending therefrom, one of said finger ridges being extended from said top of said housing, another of said finger ridges being extended from said bottom of said housing, said finger ridges being located towards said second end of said housing;

a base compartment being defined between said finger ridges and said second end of said housing, said base compartment being for resting another portion of a jack therein, said finger ridges defining a throughway therebetween between said U-shaped compartment and said base compartment;

said finger ridges being substantially collinear;

said finger ridges being extended substantially perpendicular to said elongate ridge;

said housing having first, second and third regions, said first region being located towards said first end of said housing, said second region being located towards said second end of said housing, said third region of said housing being interposed between said first and second regions of said housing, wherein said bottom of said housing located at said first region tapers from said third region of said housing towards said first end of said housing, wherein said top of said housing located at said second region has an extended portion extending therefrom such that the distance between said top and bottom of said housing in said second region of said housing is greater than the distance between said top and bottom of said housing in said third region of said housing, wherein said top and bottom of said housing in said third region of said housing are generally parallel to one another;

said back portion of said housing having a plurality of mounting apertures extending between said inner and outer surface of said housing, each of said mounting apertures being for extending a fastener therethrough to mount said back portion to a side wall of a load bed of a vehicle; and wherein a mounting aperture is positioned in each of said regions of said housing for evening the stress along the back portion of the housing from the fasteners holding the back portion to the side wall of the load bed of the vehicle.

13. In combination:

a vehicle having a load bed having an upwardly extending side wall and an upwardly extending rear wheel well adjacent said side wall;

a housing being formed from separable front and back portions and having inner and outer surfaces, a top, a bottom, opposite first and second ends, and a plurality of corners, said inner surface of said housing defining an interior space, wherein said housing comprises plastic, wherein said corners of said housing are rounded;

said front and back portions of said housing being hingedly coupled together at said bottom of said housing;

a pair of spaced apart tabs being extended from said top of said housing, each of said tabs having first and second separable portions, said first portion of each of said tabs being located on said front portion of said housing, said second portion of each of said tabs being located on said back portion of said housing, each of said tabs having a hole extending therethrough between its respective said first and second portions, each of said holes of said tabs being adapted for extending a locking bolt of a padlock therethrough;

said housing having a longitudinal axis extending between said first and second ends of said housing;

a zone line being extended across said housing substantially perpendicular to said longitudinal axis of said housing, said zone line being positioned at a midpoint along said longitudinal axis of said housing, said midpoint being positioned essentially equidistant between said first and second ends of said housing;

said zone line dividing said housing into first and second halves;

one of said tabs being located in said first half, another of said tabs being located in said second half for helping prevent opening of said housing when locks are extended through said holes of said tabs;

said inner surface of said housing located on said back portion of said housing having an elongate ridge being extended therefrom between said ends of said housing, said elongate ridge defining a generally U-shaped compartment for resting a portion of a jack therein;

said inner surface of said housing located on said back portion of said housing having a pair of opposing and spaced apart finger ridges outwardly extending therefrom, one of said finger ridges being extended from said top of said housing, another of said finger ridges being extended from said bottom of said housing, said finger ridges being located towards said second end of said housing;

a base compartment being defined between said finger ridges and said second end of said housing, said base compartment being for resting another portion of a jack therein, said finger ridges defining a throughway therebetween between said U-shaped compartment and said base compartment;

said finger ridges being substantially collinear;

said finger ridges being extended substantially perpendicular to said elongate ridge;

said housing having first, second and third regions, said first region being located towards said first end of said housing, said second region being located towards said second end of said housing, said third region of said housing being interposed between said first and second regions of said housing, wherein said bottom of said housing located at said first region tapers from said third region of said housing towards said first end of said housing, wherein said top of said housing located at said second region has an extended portion extending therefrom such that the distance between said top and bottom of said housing in said second region of said housing is greater than the distance between said top and bottom of said housing in said third region of said housing, wherein said top and bottom of said housing in said third region of said housing are generally parallel to one another;

said back portion of said housing having a plurality of mounting apertures extending between said inner and outer surface of said housing;

wherein a mounting aperture is positioned in each of said regions of said housing;

said back portion of said housing being positioned adjacent said side wall above said rear wheel well of said vehicle;

each of said mounting apertures having a fastener extended therethrough and into said side wall to coupled said back portion to said side wall of said vehicle;

said housing having a length defined between said first and second ends of said housing, a height defined between said top and bottom of said housing and a thickness defined between said front and back sides of said housing, wherein said length of said housing is less than about 58 inches, wherein said height of said housing is less than about 12 inches, and wherein said thickness of said housing is less than about 8 inches; and a jack being disposed in said U-shaped compartment and said base compartment, said jack being extended through said throughway between said U-shaped compartment and said base compartment.

* * * * *